US012673423B2

(12) United States Patent
Lin et al.

(10) Patent No.: US 12,673,423 B2
(45) Date of Patent: Jul. 7, 2026

(54) COLLISION MAP GENERATION AND PLANNING

(71) Applicant: FANUC CORPORATION, Yamanashi (JP)

(72) Inventors: Hsien-Chung Lin, Fremont, CA (US); Yutarou Momosaki, Yamanashi (JP); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 70 days.

(21) Appl. No.: 18/775,364

(22) Filed: Jul. 17, 2024

(65) Prior Publication Data

US 2026/0021582 A1 Jan. 22, 2026

(51) Int. Cl.
*B25J 9/16* (2006.01)
*G05B 19/4061* (2006.01)

(52) U.S. Cl.
CPC ........... *B25J 9/1666* (2013.01); *B25J 9/1676* (2013.01); *G05B 19/4061* (2013.01); *G05B 2219/39094* (2013.01)

(58) Field of Classification Search
CPC ...... B25J 9/1664; B25J 9/1666; B25J 9/1676; B25J 9/1671; G05B 19/402; G05B 19/4061; G05B 19/4068; G05B 19/4069; G05B 19/4093–4099; G05B 2219/39094; G05B 2219/40468; G05B 2219/40317; G05B 2219/40095
See application file for complete search history.

(56) References Cited

U.S. PATENT DOCUMENTS

2014/0163720 A1* 6/2014 Nelaturi ................. G06F 30/00
                                                    700/186
2020/0306910 A1* 10/2020 Niikura ................. B23Q 15/22

OTHER PUBLICATIONS

Pan, Jia, Sachin Chitta, and Dinesh Manocha. "FCL: A general purpose library for collision and proximity queries." 2012 IEEE International Conference on Robotics and Automation. IEEE, 2012.

* cited by examiner

*Primary Examiner* — Spencer D Patton
(74) *Attorney, Agent, or Firm* — Shumaker, Loop & Kendrick LLP

(57) ABSTRACT

An object interference checking technique using collision maps. A CAD model of a workpiece is converted to an obstacle height map defining obstacle height above a reference plane for each cell of a grid. A CAD model of a tool is used to construct a tool height map. The obstacle height map and the tool height map are used to generate a collision map defining a collision-free tool height above each grid cell of the collision map. The collision map is generated by scanning the tool height map over the obstacle height map and, for each scan point, determining a height of the tool height map which results in no interferences between any pixel of the tool height map and a corresponding pixel of the obstacle height map. A collision check of a tool trajectory is then performed by comparing trajectory check points to grid cells of the collision map.

26 Claims, 13 Drawing Sheets

500

Provide path check point $(x_{tcp}, y_{tcp}, z_{tcp})$ — 1052

Update tool height map position by TCP — 1054

For each pixel $(x_i, y_i, z_i)$ in tool height map — 1056

More pixels ? — 1060

Yes

No

Tool pixel i within obstacle height map region ? — 1058

No

Yes — 1062

Convert $x_i, y_i$ to map index $r_i, c_i$

Is $z_i - d_{safe}$ vi $Hmap(r_i, c_i)$ ? — 1064

No

Yes

Return collision — 1066

1050

1000

1010

1022

1020

COLLISION MAP GENERATION AND PLANNING

BACKGROUND

Field

The present disclosure relates to the field of industrial machine motion control and, more particularly, to an object interference checking technique which uses an obstacle height map and a tool height map to generate a collision map which defines a collision-free tool height above each grid cell of the collision map, then performs a collision check of a tool trajectory by comparing trajectory check points to grid cells of the collision map.

Discussion of the Related Art

The use of multi-axis machine tools to perform a wide range of operations such as milling and drilling is well known. In many machine tool workspace environments, obstacles are present and may be in the path of the tool's motion. The obstacles may be permanent structures such as fixtures which are present in the workspace. A workpiece which is being operated on by the machine tool may itself be an obstacle, as the machine tool must maneuver over or around the workpiece while moving from one machining operation to the next. Collisions between any part of the machine tool and any obstacle must absolutely be avoided.

It is known to include interference checking algorithms in motion planning routines, including during real-time motion planning. One prior art technique for interference checking involves defining geometry primitives—such as spheres, cylinders, etc.—around parts of the machine tool and around each obstacle. Geometry primitives are used in order to reduce the complexity of the interference checking calculation to a manageable level so that it can be performed quickly enough for real-time motion planning. However, defining the geometry primitives around each obstacle and machine tool part is a tedious and time-consuming process. Furthermore, most workpieces which are being operated on by the machine tool do not lend themselves well to approximation using geometry primitives. Conservative approximations of geometry primitive shapes can lead to false positive interference conditions.

Another prior art technique for interference checking uses CAD models of the machine tool and obstacles. Using CAD models in interference checking calculations avoids the inaccuracy problem of geometry primitives. However, this method requires calculating distances and detecting interferences between all locations on one CAD model (e.g., the tool) and all locations on the CAD models of every other potential obstacle in the workspace (including fixtures, the workpiece, etc.). This calculation is compute-intensive and slow for all except the simplest workspace environments. In most cases, the collision avoidance calculations take too long to be practical in situations where motion planning computations must be performed in real time as the machine tool operates. Signed distance field (SDF) techniques are known which simplify the geometry into a 3D grid which is used for distance or interference calculations, but this method still involves significant computational complexity.

Other interference checking techniques are also known in the art, including an axis-aligned bounding box (AABB) tree method. The AABB tree method covers object bodies by bounding boxes and checks to determine if the boxes overlap. This method also suffers from inaccuracies due to approximations, and can also involve complex setup and lengthy computation times.

In light of the circumstances described above, there is a need for an improved object interference checking technique which is easy to set up and which computes potential object interferences quickly and accurately, including being usable in real-time machine tool collision avoidance path planning.

SUMMARY

In accordance with the teachings of the present disclosure, an object interference checking technique using collision maps is disclosed. A CAD model of a workpiece or other obstacle is converted to an obstacle height map defining obstacle height above a plane of a reference frame for each cell of a grid. A CAD model of a tool is similarly used to construct a tool height map relative to a tool center point. The obstacle height map and the tool height map are used to generate a collision map which defines a collision-free tool height above each grid cell of the collision map. The collision map is generated by scanning the tool height map over the area of the obstacle height map and, for each scan point location, determining a height of the tool height map which results in no interferences between any pixel of the tool height map and a corresponding pixel of the obstacle height map. A collision check of a tool trajectory is then performed by comparing trajectory check points to grid cells of the collision map.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to object interference checking using height maps and collision maps is merely exemplary in nature, and is in no way intended to limit the disclosed devices and techniques or their applications or uses.

It is well known to use multi-axis machine tools to perform a wide range of machining operations such as milling and drilling. In many machine tool workspace environments, obstacles are present and may be in the path of the tool's motion. The obstacles may be permanent structures such as fixtures which are present in the workspace. A workpiece which is being operated on by the machine tool may itself be an obstacle, as the machine tool must maneuver over or around the workpiece while moving from one machining operation to the next. Collisions between any part of the machine tool and any obstacle must absolutely be avoided. The present disclosure describes techniques for rapidly performing interference checking of motion plans for applications such as these.

Figure 1:
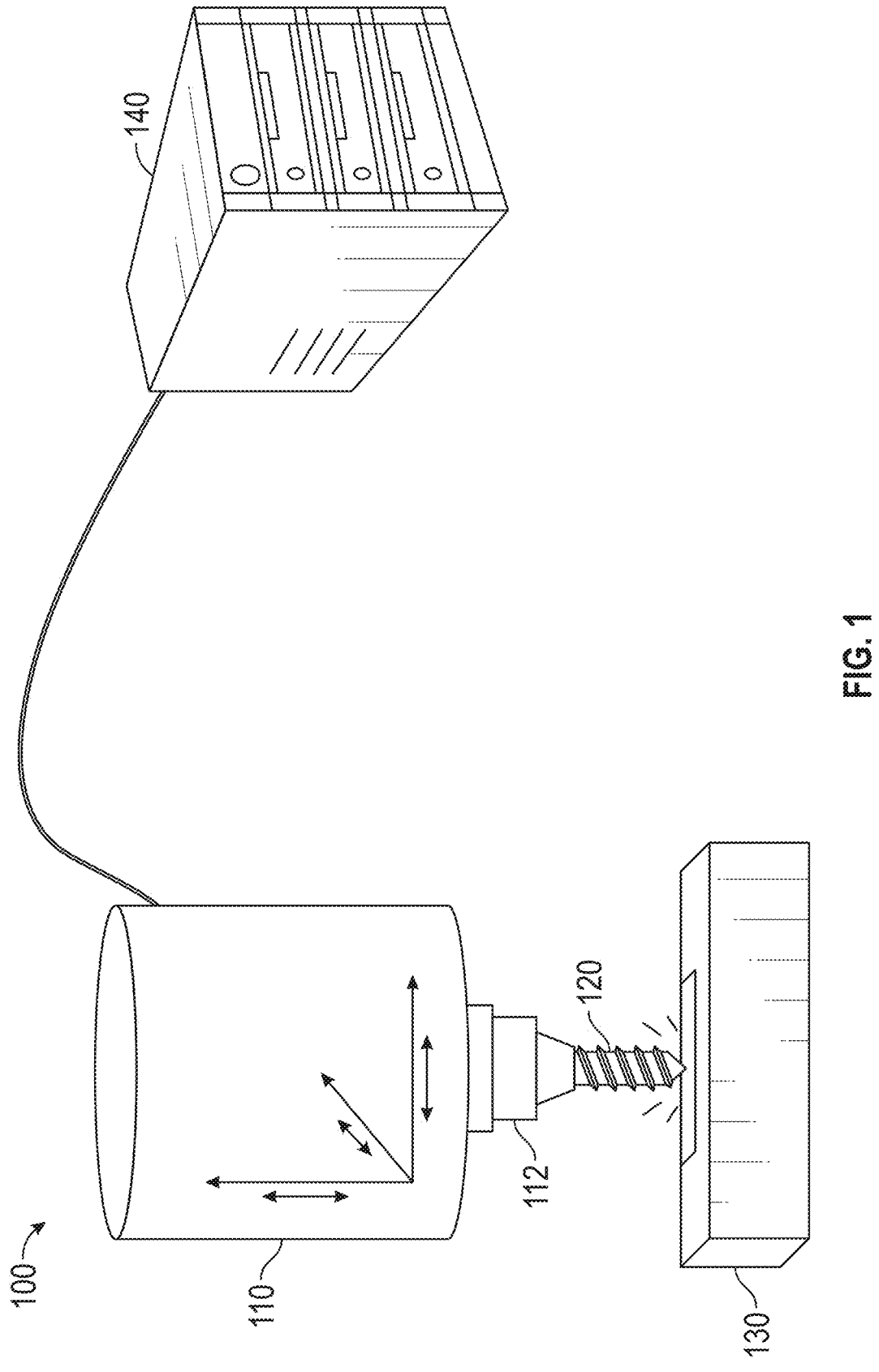
FIG. 1 is a schematic illustration of a system including a computer-controlled machine tool performing a machining operation on a workpiece, of a type applicable to the techniques of the present disclosure.

FIG. 1 is a schematic illustration of a system 100 including a computer-controlled machine tool performing a machining operation on a workpiece, of a type applicable to the techniques of the present disclosure. A machine tool 110 rotates a spindle 112 in which is secured a cutting tool 120. The machine tool 110 causes the cutting tool 120 to perform a machining operation on a workpiece 130. The machine tool 110 is in communication with a controller 140, which is a computing device that provides motion commands and spindle motor speed commands to the machine tool 110. In a typical example, the machine tool 110 would move the rotating cutting tool 120 from a start point along a path which causes material to be cut from the workpiece 130, then disengage the cutting tool 120 from the workpiece 130. Before performing a next cutting step, the machine tool 110 must move the cutting tool 120 to the start point of a next operation; this movement between cutting steps is known as an air cut step. The machining operation may include milling, drilling or tapping, for example.

As will be discussed in detail below, the techniques of the present disclosure are applicable to the system 100 of FIG. 1—in particular, to computing a collision-free path for an air cut step between machining operations. The presently disclosed collision avoidance methods using height maps and collision maps may be programmed in the controller 140 using data that is available in or easily provided to the controller 140. Portions of the interference check calculations discussed below may also be programmed in a separate computer which is in communication with the controller 140. While the height map and collision map interference check calculations are described below in terms of a collision avoidance application for an air cut step, the same techniques may be applied to a cutting step where a thickness of material cut may be computed using the height maps and collision maps.

The elements of FIG. 1 are depicted in rather simple fashion, where the machine tool 110 is movable in three principle axes of motion—including "vertically" (parallel to the axis of the cutting tool 120) and in two "horizontal" directions (orthogonal to the axis of the cutting tool 120). However, the techniques of the present disclosure are not limited to being applied to the vertical and horizontal directions as shown in FIG. 1 and later figures. It is to be understood that the height map and collision map collision avoidance methods of the present disclosure are applicable to any type of machine tool where a collision-free path of a tool relative to a workpiece or other obstacle must be computed-including multi-axis machines with complete tool positioning and spatial orientation capability, and robotically-controlled mills and drills with an articulated robot arm providing complete tool positioning and orientation flexibility.

Figure 2:
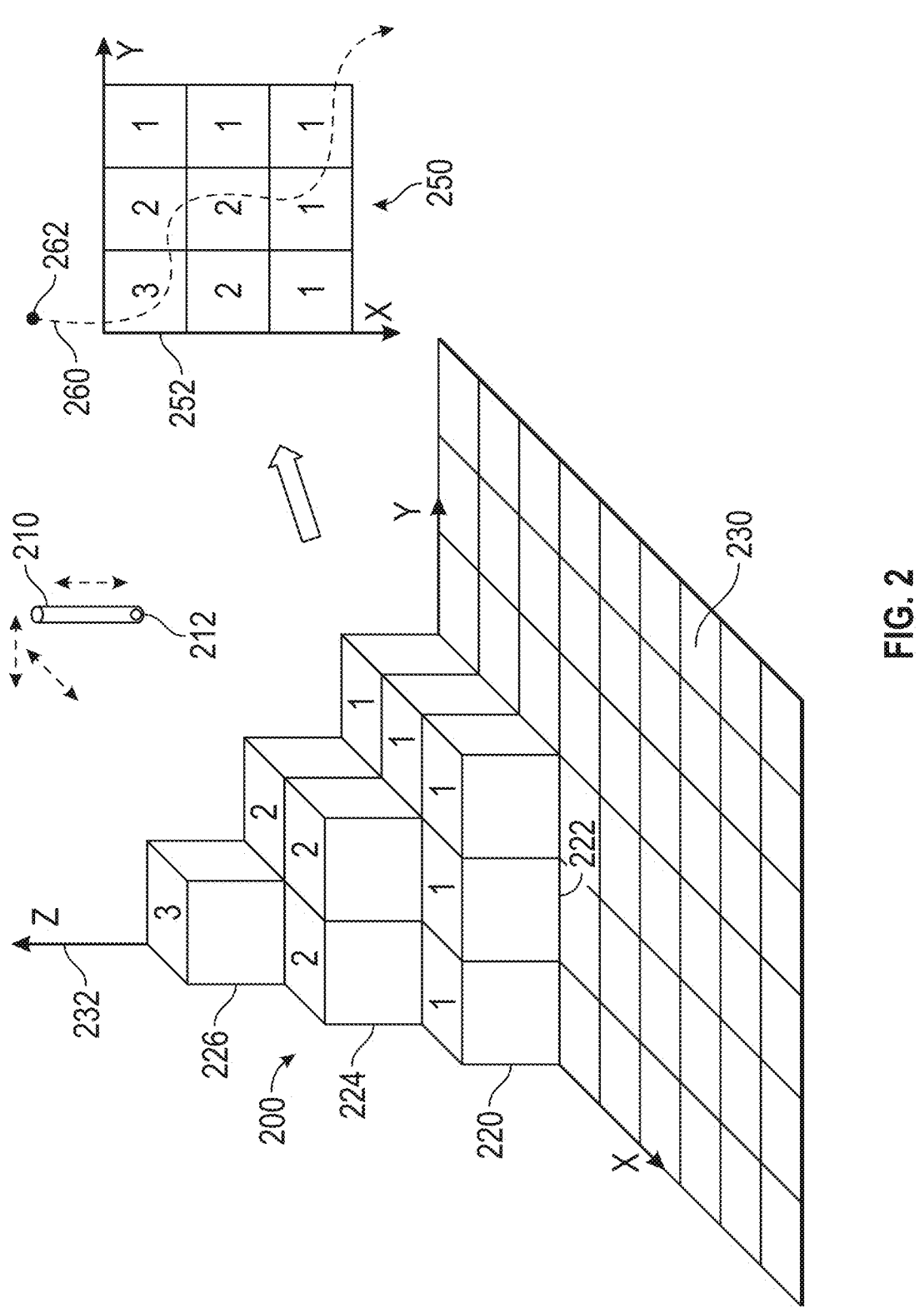
FIG. 2 is an illustration of a height map for a simple object, depicting how height above a reference plane is defined for each cell of a grid projected on the reference plane, according to an embodiment of the present disclosure.

FIG. 2 is an illustration of a height map for a simple object, depicting how height above a reference plane is defined for each cell of a grid projected on the reference plane, according to an embodiment of the present disclosure. An object 200 is located in a workspace where a cutting tool 210 is to perform an operation. The cutting tool 210 is illustrated as a simple thin cylinder, representing a tool such as an end mill. It is to be understood that an entire machine tool is also present in the workspace, as illustrated in FIG. 1. The cutting tool 210 has a tool center point 212, the path of which is controlled by a machine controller, as also shown in FIG. 1.

The object 200 has a very simple shape, as if it were created by joining together fourteen small cubes in a stack as shown. Cubes 220 and 222 (and several others, unnumbered) are on a bottom layer and have nothing above them. A cube 224 (and others) is on top of a bottom layer cube and has nothing above it. A cube 226 is on top of two other cubes. Each cube which is visible in FIG. 2 has a numeric value applied to its top surface. This value represents the height of the object above a grid which is applied to a reference plane 230. The reference plane 230 is the X-Y plane of a reference coordinate frame 232.

A height map 250 is shown at right, corresponding with the object 200. The height map 250 is defined by a grid in the reference plane 230 (i.e., the X-Y plane), where each grid cell contains a numeric value indicating the height of the object in that grid cell. For example, a grid cell 252 has a height value of 3, which corresponds with the cube 226 of the object 200 shown at left. The correlation between the grid cell values in the height map 250 and the height of each portion of the object 200 is clearly apparent.

A tool center point path 260 passes over the height map 250. The tool center point path 260 represents the path of the tool center point 212 as it moves over the object 200. The tool center point path 260 starts at a point 262 outside the height map grid and enters the height map 250 over the grid cell 252. It is therefore known that the tool center point path 260, when represented in the coordinates of the reference frame 232, must have a height value (Z coordinate) of greater than 3 when the path 260 is over the grid cell 252. The path 260 then passes over two grid cells having a height value of 2, and finally two more grid cells having a height value of 1. The height value (Z coordinate) of the tool center point path 260 is checked against the height map value for each grid cell that the path 260 passes over.

FIG. 2 is provided as an illustration of the basic concept of a height map, and using the height map to check for collisions with a tool following a path. The block-like shape of the object 200 and the integer height values are merely for the sake of simplicity and clarity. In actual implementation, a height map may be created for any arbitrarily shaped object, where the height map value contained in each grid cell is the maximum height of the object above the reference plane within the vertical projection of the grid cell. These height values may be defined to any desired level of accuracy (units and significant figures). This type of application is shown in several of the following figures and discussed in detail below. Also, the Z axis orientation of the height map need not be vertical in actual world coordinates; the height map reference frame may have any arbitrary orientation as suitable.

Figure 3:
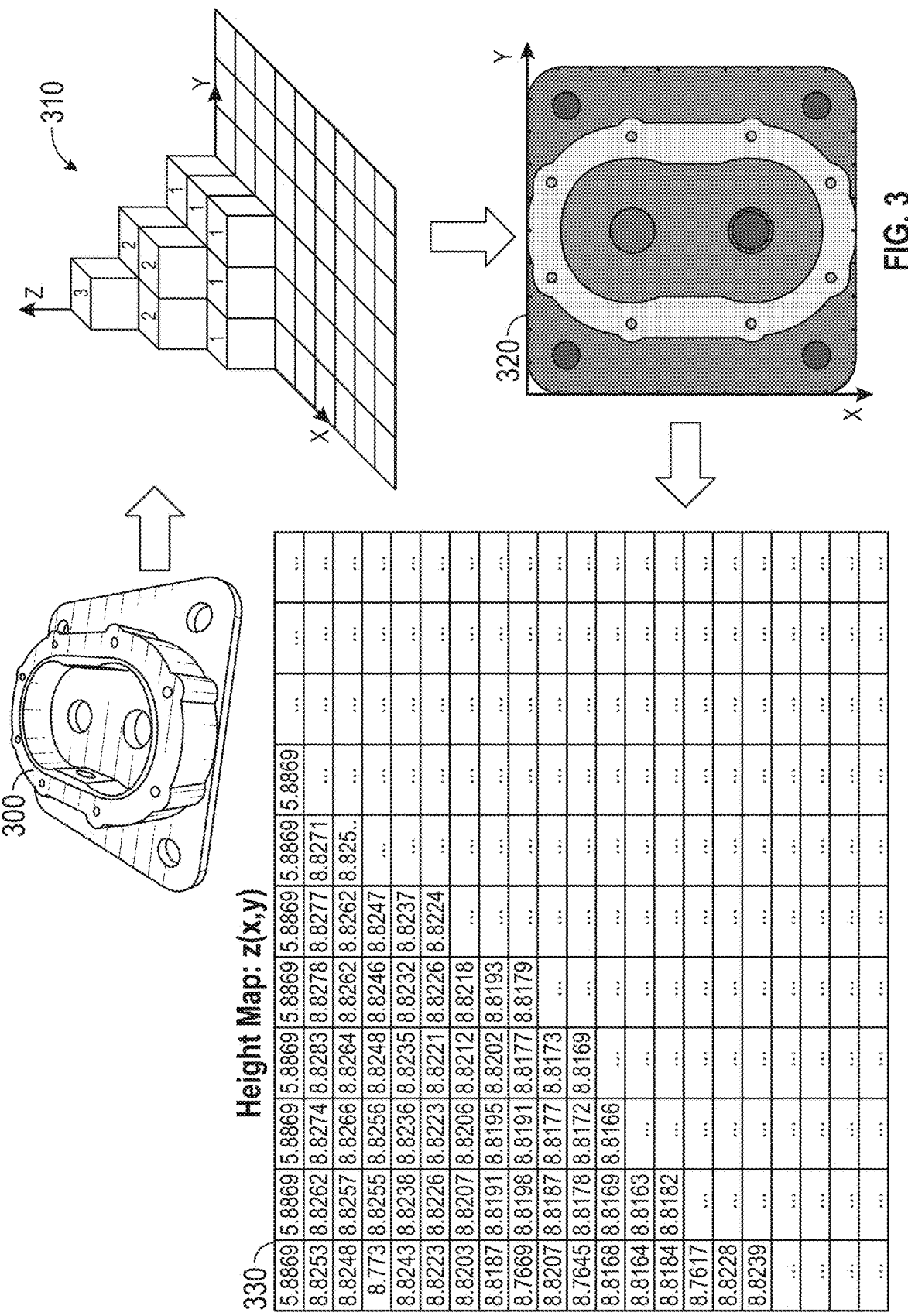
FIG. 3 is an illustrated flow diagram of a method for creating a height map of a workpiece which is an obstacle to a machine tool path, according to an embodiment of the present disclosure.

FIG. 3 is an illustrated flow diagram of a method for creating a height map of a workpiece which is an obstacle to a machine tool path, according to an embodiment of the present disclosure. A workpiece 300 is illustrated in solid or surface model form at the top left, as it would be defined in a computer-aided design (CAD) system. Given the CAD model of the workpiece 300, a height map is created for the workpiece 300 at step 310, using the technique discussed above with respect to FIG. 2. That is, a reference coordinate frame is defined and the CAD model of the workpiece 300 is positioned in a suitable fashion in the reference frame. In a typical application, the reference frame is defined with its X-Y plane representing a top surface of a table or fixture on which the workpiece 300 is fixed in a workspace. A grid cell size in the X and Y directions (which may be the same or different) is defined. Then, for each grid cell in the height map, the maximum height (Z coordinate) of the workpiece 300 in the reference coordinate frame is determined.

A height map image 320 depicts the workpiece 300 in a "top" view, that is, normal to the X-Y plane of the height map reference frame. The colors or grayscale shades in the image 320 represent the height value of each grid cell in the height map. The height map image 320 is provided simply as a visual representation of the height map concept; the image 320 itself is not used in subsequent interference checking calculations. A height map 330 is a two-dimensional (2D) matrix having a number of rows and columns which is determined by the size of the workpiece 300 and the X and Y grid cell sizes. Each grid cell in the height map 330 contains the maximum height of the workpiece 300 within that grid cell. That is, the height map 330 defines z(x, y), where z is the height value (Z coordinate) in the height map reference frame for a given grid cell (x, y pair). The height map 330 is used for interference checking a tool path, as discussed above and described in further detail below.

The height map 330 is simplified in FIG. 3, showing numbers in some matrix cells, and ellipses (" . . . ") filling in the remainder of the matrix. The height map 330 is meant to illustrate the concept, and the numbers shown in some matrix cells are not important and are not meant to be readily legible.

Figure 4:
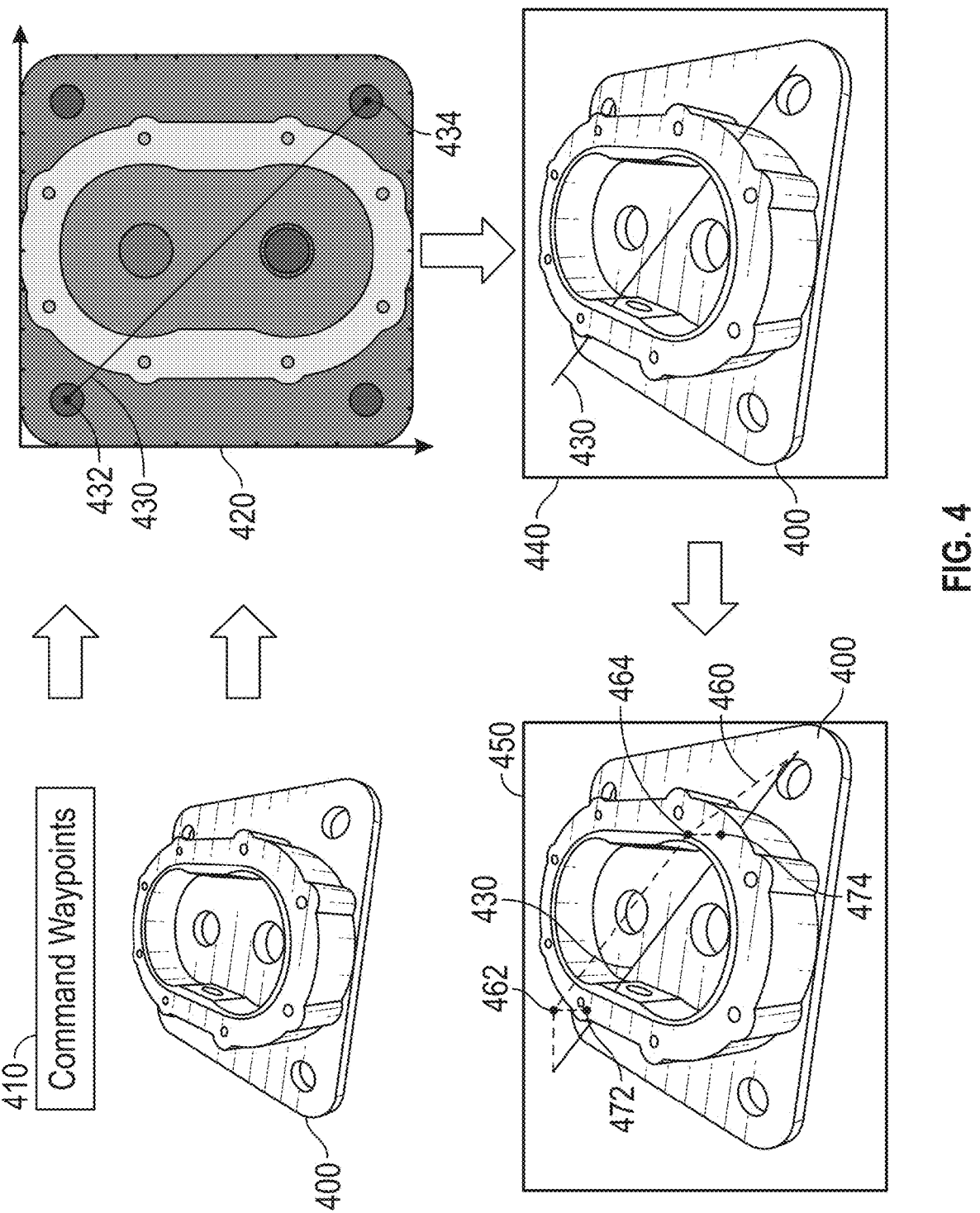
FIG. 4 is an illustrated flow diagram of a method for using the height map of FIG. 3 to perform an interference check of a tool center point path and define a new collision avoidance path based on interferences detected using the height map, according to an embodiment of the present disclosure.

FIG. 4 is an illustrated flow diagram of a method for using the height map of FIG. 3 to perform an interference check of a tool center point path and define a new collision avoidance path based on interferences detected using the height map, according to an embodiment of the present disclosure. A CAD model of a workpiece 400 is provided as input, in the same manner discussed earlier. Waypoints for a tool path are also provided as input at box 410. The tool path waypoints provided at the box 410 include at least start and end points, and may also include intermediate waypoints which are joined in piecewise linear segments, spline curves, or some other path shape to define a tool trajectory.

A height map 420 is calculated for the workpiece 400, in the manner discussed above. The height map 420 is shown in FIG. 4 as the visual representation; it is to be understood that the height map numerical matrix which represents z(x, y) for the workpiece 400 is calculated and used in the collision avoidance computations. A tool center point path 430 is shown superimposed on the height map 420. The tool center point path 430 in this case is a straight line from a start point 432 to an end point 434. This might be the case, for example, if the tool machines a hole in one corner of the workpiece 400, then the tool lifts up and needs to traverse along the path 430 before machining a hole in another corner of the workpiece 400. The tool center point path 430 must be transposed to the height map reference coordinate frame in order to perform the interference check calculations using the height map.

In a box 440, the tool center point path 430 is shown in an isometric view along with the workpiece 400, where it can be seen that the tool center point path 430 passes over and through the workpiece 400. It is apparent in the box 440 that the tool center point path 430 interferes with two different parts of the workpiece 400. In a box 450, the workpiece 400 is shown with the tool center point path 430, along with a collision avoidance path 460 (dashed line). Using the height map 420 in calculations discussed below, it is determined that the tool center point path 430 interferes with the workpiece 400 in two locations, indicated at points 472 and 474. At the point 472, a new collision avoidance waypoint 462 is defined, and at the point 474, a new collision avoidance waypoint 464 is defined. The new collision avoidance waypoints 462 and 464 are defined having a vertical offset from collision check points which were part of the tool center point path 430 and which were determined to interfere with the workpiece 400. The collision avoidance path 460 is computed from the original start point 432 to the end point 434, using the new collision avoidance waypoints 462 and 464 as intermediate waypoints. The height map interference check calculations may be performed again on the collision avoidance path 460 to confirm that there are no remaining interferences with the workpiece 400.

The interference checking calculation of the tool center point path 430 against the height map 420 is a very fast computation, as is the calculation of the new collision avoidance waypoints. These computations are discussed below.

Figure 5:
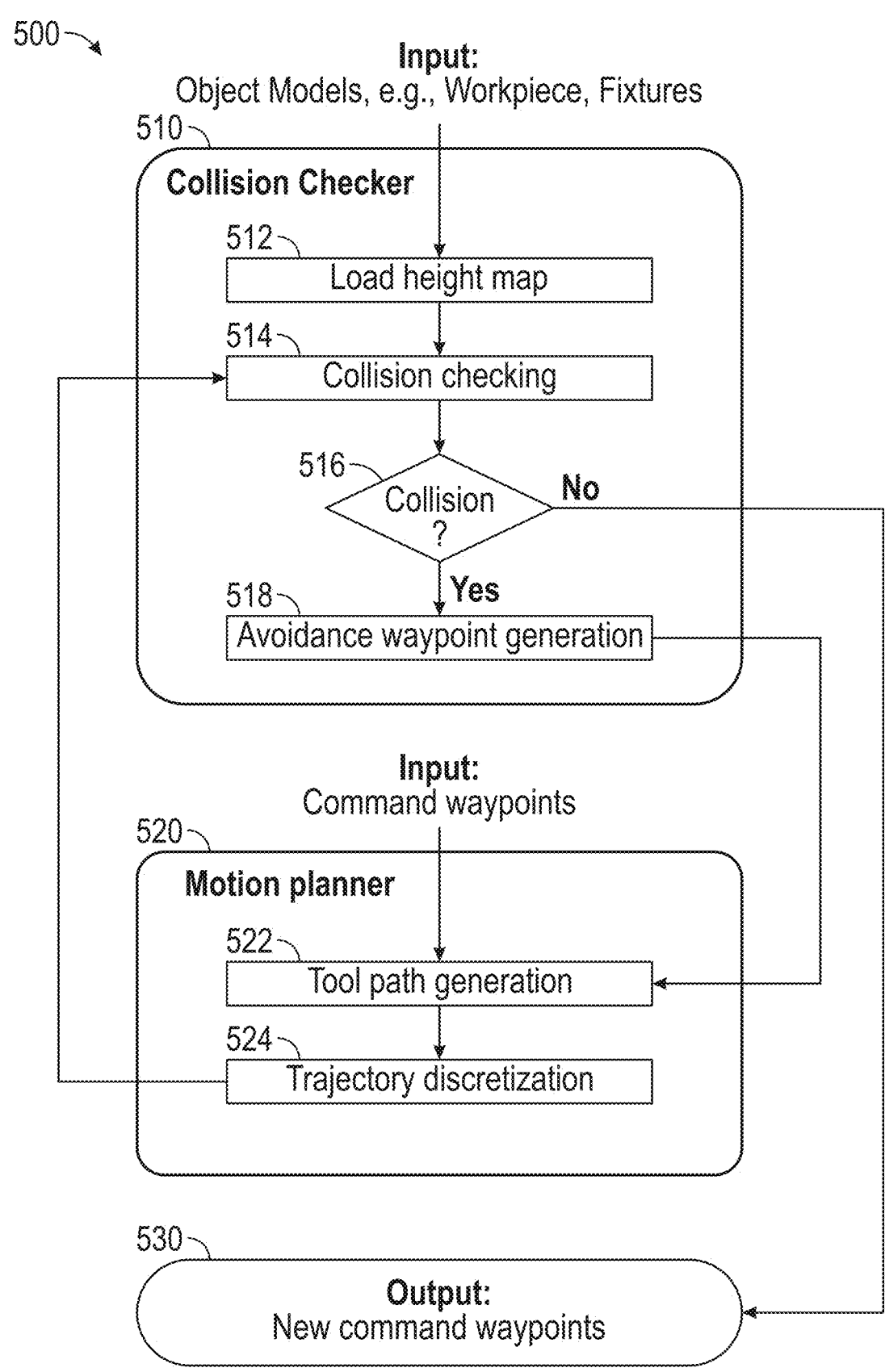
FIG. 5 is a flow chart diagram of a method for performing an interference check of a tool center point path and defining a new collision avoidance path based on interferences detected using a height map, according to an embodiment of the present disclosure.

FIG. 5 is a flow chart diagram 500 of a method for performing an interference check of a tool center point path and defining a new collision avoidance path based on interferences detected using a height map, according to an embodiment of the present disclosure. The flowchart diagram of FIG. 5 is arranged in steps performed by a collision checker in a block 510 and steps performed by a motion planner in a block 520.

Inputs to the collision checker block 510 include object models of the workpiece and any other object which could be an obstacle to the tool path. In the examples discussed earlier, the obstacle was the workpiece which was being operated on by the machine tool. Other workspace obstacle could include fixtures, for example. The object models are typically provided as CAD solid or surface models. The input to the motion planner block 520 is an initial set of command waypoints. The command waypoints would typically be for an air cut step as discussed earlier, such as moving the tool from one hole machining location to another hole machining location.

At box 512, a height map for the obstacle(s) (e.g., the workpiece) is calculated and loaded. This includes transposing the workpiece object model into a height map reference coordinate frame (such as a workcell "world" coordinate frame, or a coordinate frame having its X-Y plane on a top surface of a table in the workcell). With the workpiece object model transposed to the height map reference coordinate frame, the height map is calculated as discussed earlier, providing the 2D matrix of height values for an X-Y grid of cells.

At box 522, a tool path is generated for the command waypoints which were provided as input. In the examples discussed earlier, the initial tool path was a straight line from a start point to an end point. However, this was merely an example. The tool path may have other shapes-such as a spline function fitted through several command waypoints, for example. At box 524, the tool path (trajectory) is discretized into a set of interference check points. The interference check points are the individual points along the continuous tool path which will be compared to the height map.

At box 514, each of the interference check points from the box 524 is collision checked against the height map from the box 512. This calculation is discussed below with respect to FIG. 6. At decision diamond 516, it is determined whether any collisions have been detected at the box 514. If any collisions are detected, then at box 518, collision avoidance waypoints are generated for any interference check points which interfered with the height map. This collision avoidance waypoint generation was shown in the box 450 of FIG. 4. After new collision avoidance waypoints are generated at the box 518, the process returns to the box 522 to generate a new tool path using the collision avoidance waypoints. The new collision avoidance waypoints are used in addition to the original command waypoints to generate a new tool path. The new tool path is then discretized at the box 524 and the height map collision checking process is repeated.

When the collision checking process results in no collisions, the process moves from the decision diamond 516 to a block 530 where the new command waypoints are output and used for machine tool motion control. The new command waypoints include a combination of the original command waypoints (typically at least the start and end points) and any collision avoidance waypoints which were generated at the box 518 of a previous pass through the process.

Figure 6:
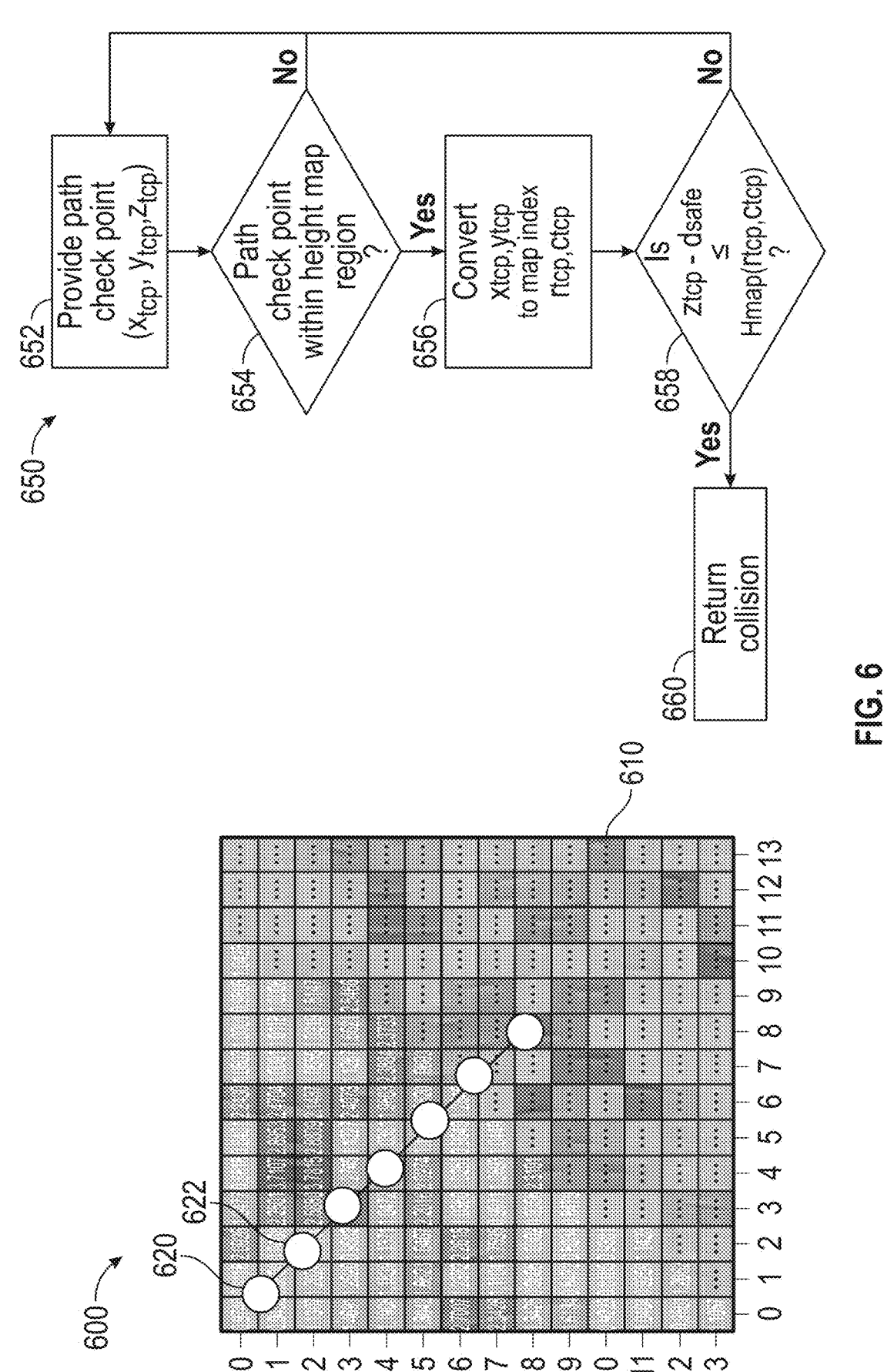
FIG. 6 is an illustration of a technique for interference checking individual path points of a machine tool center point path using an obstacle height map, and a flowchart diagram of corresponding method steps, according to an embodiment of the present disclosure.

FIG. 6 includes an illustration 600 of a technique for interference checking individual path points of a machine tool center point path using an obstacle height map, and a flowchart diagram 650 of corresponding method steps, according to an embodiment of the present disclosure. A height map 610 includes height values for a 2D matrix of cells in an X-Y grid, as discussed above. The height map 610 represents any obstacle environment which may exist in a workcell—such as a workpiece, a workpiece along with a fixture, etc. The height map 610 is shown somewhat conceptually in FIG. 6—with most of the height value numbers replaced by ellipses for simplicity. The grid cells of the height map 610 are shaded to represent various ranges of the height value, as also discussed earlier.

A plurality of interference check points (620, 622, and others unnumbered) are shown superimposed on the height map 610. The interference check points 620/622/etc. are the discretized representation of a tool center point path, as discussed above with respect to FIG. 5. The flowchart diagram 650 defines the steps performed in the collision checking box 514 of FIG. 5.

At box 652, an interference check point for the tool path (e.g., the check point 620) is provided. The check point has a location ($x_{tcp}$, $y_{tcp}$, $z_{tcp}$) in the coordinates of the height map reference coordinate frame. At decision diamond 654, it is determined whether the check point coordinates lie within the region of the height map 610. For example, based on the size of the workpiece, the height map 610 may have a size in the height map reference coordinate frame of 500×500 mm, defined so that the height map is defined for coordinate ranges $0 \leq x \leq 500$ and $0 \leq y \leq 500$. If, at the decision diamond 654, the check point has X and Y coordinates ($x_{tcp}$, $y_{tcp}$) which are outside the height map region, then the process returns to the box 652 to provide the next check point.

If the check point is within the height map region, then at box 656, the check point X-Y coordinates ($x_{tcp}$, $y_{tcp}$) are converted to height map row-column indices. For example, if the height map 610 defines a space of 500×500 mm, and the grid cell size is 5 mm square, then the height map 610 comprises 100 rows and 100 columns of grid cells. The calculation at the box 656 identifies the grid cell row and column ($r_{tcp}$, $c_{tcp}$) which is occupied by the check point having X and Y coordinates of ($x_{tcp}$, $y_{tcp}$).

At decision diamond 658, the collision check calculation is performed by determining whether the Z coordinate of the check point ($z_{tcp}$) minus a safety margin ($d_{safe}$) is less than or equal to the value of the height map 610 for the corresponding grid cell ($Hmap(r_{tcp}, c_{tcp})$). If the answer is yes at the decision diamond 658, this means there is an interference, and the process returns a collision condition at box 660. This corresponds with a yes at the decision diamond 516 of FIG. 5. If the answer is no at the decision diamond 658, this means that the check point being evaluated is safely above the height map, and the process returns to the box 652 to evaluate the next check point. This process continues until no check points remain in the tool path.

The height map interference check technique discussed above provides very fast and accurate interference check results for obstacles in a machine tool workspace. However, in some applications, interference checking the tool center point alone is not sufficient to guarantee a collision-free machine tool motion plan. Enhanced techniques for addressing this situation are discussed below.

Figure 7:
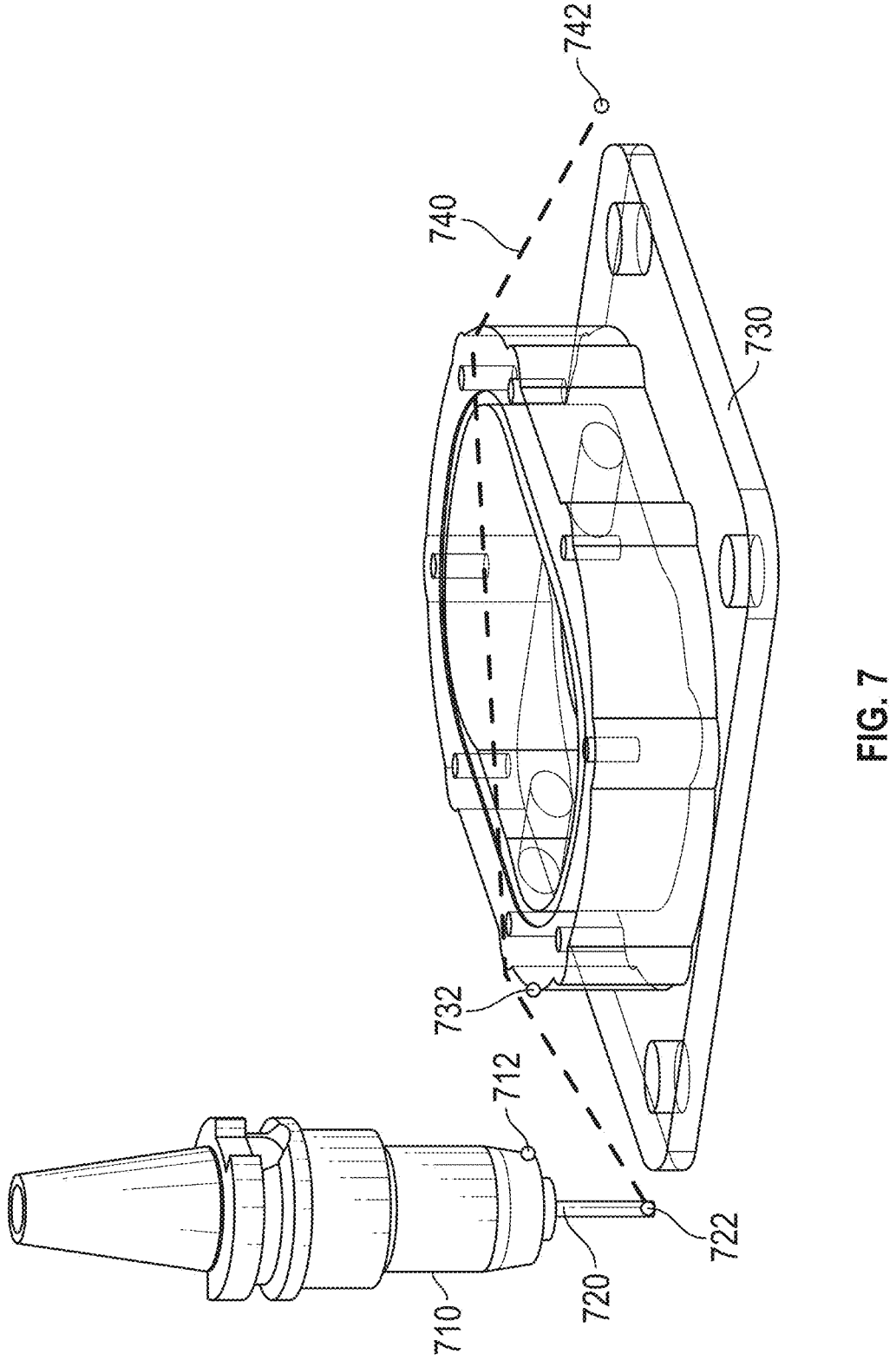
FIG. 7 is an illustration of a machine tool maneuvering in an environment of a workpiece obstacle, depicting how a part of the tool body or holder may collide with the obstacle if only tool center point interference checking is performed, according to an embodiment of the present disclosure.

FIG. 7 is an illustration of a machine tool maneuvering in an environment of a workpiece obstacle, depicting how a part of the tool body or holder may collide with the obstacle if only tool center point interference checking is performed, according to an embodiment of the present disclosure. A tool body 710 holds a cutting tool 720. The tool body 710 includes a tool holder which is coupled to the spindle of the machine tool. Thus, the tool body 710 is more bulky than the cutting tool 720 itself. The cutting tool 720 is performing an operation on a workpiece 730, in the same manner discussed earlier.

The cutting tool 720 has a tool center point 722. Using the tool center point to height map interference checking techniques discussed above, a collision avoidance tool path 740 is computed which contains waypoints including a start point (at the location shown for the tool center point 722), two collision avoidance waypoints above the highest rim of the workpiece 730, and an end point 742. However, due to the combination of tool body shape, workpiece shape and tool path geometry, it is possible that a point 712 on the tool body 710 could collide with a point 732 on the workpiece 730 when the tool center point 722 follows the collision avoidance tool path 740. In order to handle this situation and ensure collision-free tool motion, it is necessary to model the tool as more than just the tool center point.

Figure 8:
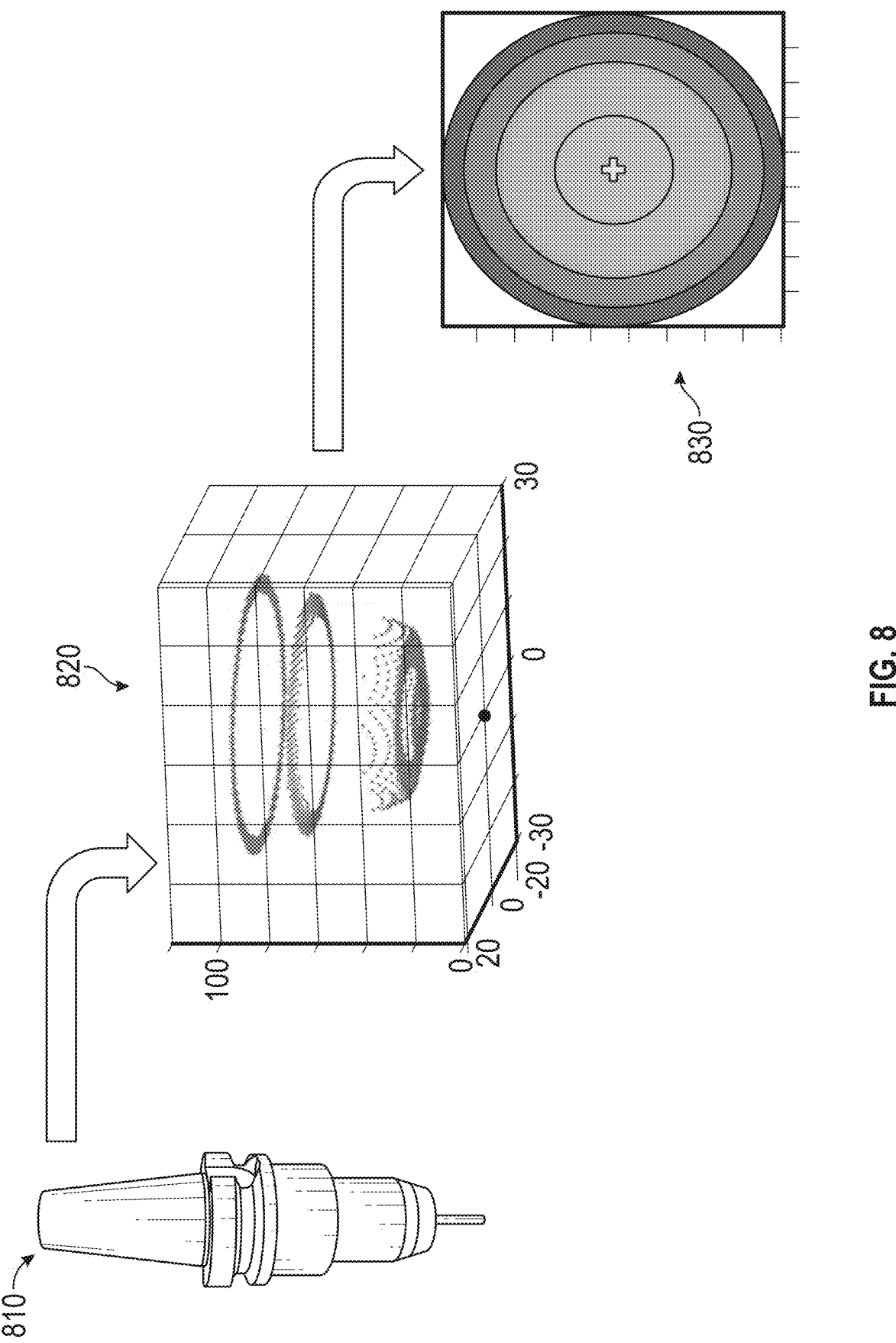
FIG. 8 is an illustration of a machine tool and a corresponding tool height map used in a map-to-map interference checking technique, according to an embodiment of the present disclosure.

FIG. 8 is an illustration of a machine tool and a corresponding tool height map used in a map-to-map interference checking technique, according to an embodiment of the present disclosure. A tool 810 includes a cutting tool and any components which couple the cutting tool to the machine spindle which may be of concern for interfering with the workpiece or other obstacle; typically this can be thought of as the tool body along with the cutting tool itself.

A tool height map point set 820 is created for the tool 810. The tool height map point set 820 is a "bottom-up" view of the tool 810 including the cutting tool itself along with the tool body. In a preferred embodiment, the tool height map point set 820 locates the tool center point at coordinates (0,0,0) of a local tool coordinate frame, and the points in the tool height map point set 820 all have positive Z coordinates. In visually comparing the tool height map point set 820 to the tool 810, it can be seen that the tool height map point set 820 includes a small cluster of points at the tool center point, a ring of points having an upward concave curvature which correspond with a lower portion of the tool body, and two more rings of points corresponding with increased diameter shoulders on the tool body.

A tool height map 830 is created from the tool height map point set 820. The tool height map 830 is shown as the visual representation, where different shading intensities represent different heights. Viewed from the bottom up, any "pixel" within the X-Y grid of the tool height map 830 will have a height value based on the Z coordinate of the point(s) within that pixel. As discussed earlier with respect to other height maps, it is to be understood that a 2D numerical matrix or grid of pixels is created for the tool height map 830, containing data defining z(x, y). This grid of height data is what is used in the computations discussed below.

The tool height map 830 is based on the actual shape of the tool body. In some embodiments, it may be desirable to provide a clearance margin around the outside of the tool body when checking for tool-to-workpiece interferences. A technique for including a radial offset margin in a tool height map is discussed later.

Figure 9:
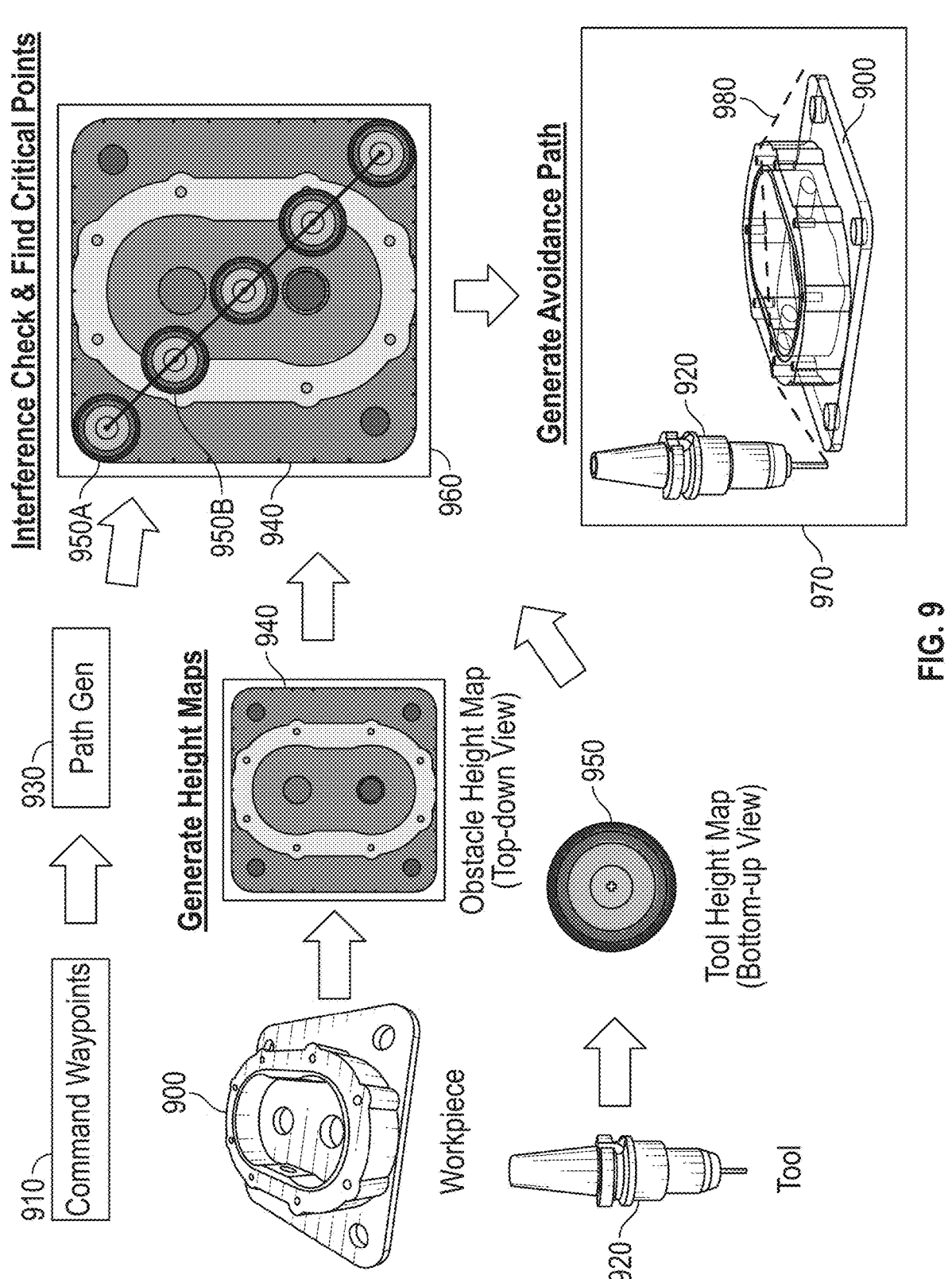
FIG. 9 is an illustrated flow diagram of a method for using an obstacle height map and a tool height map to perform an interference check of a machine tool path and define a new collision avoidance path based on interferences detected using the height maps, according to an embodiment of the present disclosure.

FIG. 9 is an illustrated flow diagram of a method for using an obstacle height map and a tool height map to perform an interference check of a machine tool path and define a new collision avoidance path based on interferences detected using the height maps, according to an embodiment of the present disclosure. A CAD model of a workpiece 900 is provided as input, and waypoints for a tool path are also provided as input at box 910, in the same manner discussed earlier. A CAD model of a tool 920 is also provided. The tool 920 includes the tool body along with the cutting tool itself, as discussed above.

An initial tool path is generated at box 930 from the command waypoints, in the same manner discussed earlier. An obstacle height map 940 is calculated for the workpiece 900. This includes defining a height map reference coordinate frame, defining a grid of cells in the X-Y plane of the reference coordinate frame, and calculating the maximum height of the workpiece in the Z direction for each grid cell. The obstacle height map 940 is a "top-down" view of the workpiece 900 (and any related obstacles such as fixtures), where the largest value in the obstacle height map 940 corresponds with the highest point of the workpiece 900.

A tool height map 950 is then calculated for the tool 920. The tool height map 950 is a "bottom-up" view of the tool 920, where each "pixel" (grid cell) in the tool height map 950 has a height value which designates the Z direction offset of that point on the tool 920 above the tool center point (the lowest point on the tool 920). The Z direction offset values in the tool height map 950 are measured in the same Z direction as the obstacle height map reference coordinate frame. In the preferred embodiment, the tool center point has a tool height map value of zero, and other points (pixels) on the tool body all have positive tool height map values. Other reference frame conventions may also be used.

The obstacle height map 940 and the tool height map 950 are both shown in image form for the purposes of illustration, where different shading intensities represent different heights. The numerical data defining z(x, y) is of course used for the interference checking calculations discussed below.

At box 960, the obstacle height map 940 is collision checked with the tool path in a manner similar to that described earlier. In this case, however, instead of just checking the tool center point against the obstacle height map 940 for each check point, many pixels of the tool height map 950 are checked against the obstacle height map 940 for each check point location. For example, for a first check point, the tool height map 950 is positioned as shown at 950A, where each pixel of the tool height map 950 is checked against a corresponding grid cell of the obstacle height map 940. After all of the pixels of the tool height map 950 are checked for the first tool path check point, the tool height map 950 is moved to the position of the next check point, as shown at 950B. This process is repeated for the entire tool path from the box 930. For any detected collisions between the tool height map 950 and the obstacle height map 940, new collision avoidance waypoints are generated. The new collision avoidance waypoints are generated in any suitable fashion—such as by determining the amount of interference between the tool height map pixel and the obstacle height map grid cell and adding that amount of vertical offset (plus an extra amount if desired) to the tool path check point to obtain the new collision avoidance waypoint.

At box 970, a collision avoidance tool path 980 is generated using the new collision avoidance waypoints. The collision avoidance tool path 980 will avoid interference between any part of the tool 920 and any part of the workpiece 900, by virtue of having collision checked the tool height map 950 against the obstacle height map 940. The workpiece 900 and the obstacle height map 940 could of course include other obstacles such as fixtures, as explained earlier.

Figure 10:
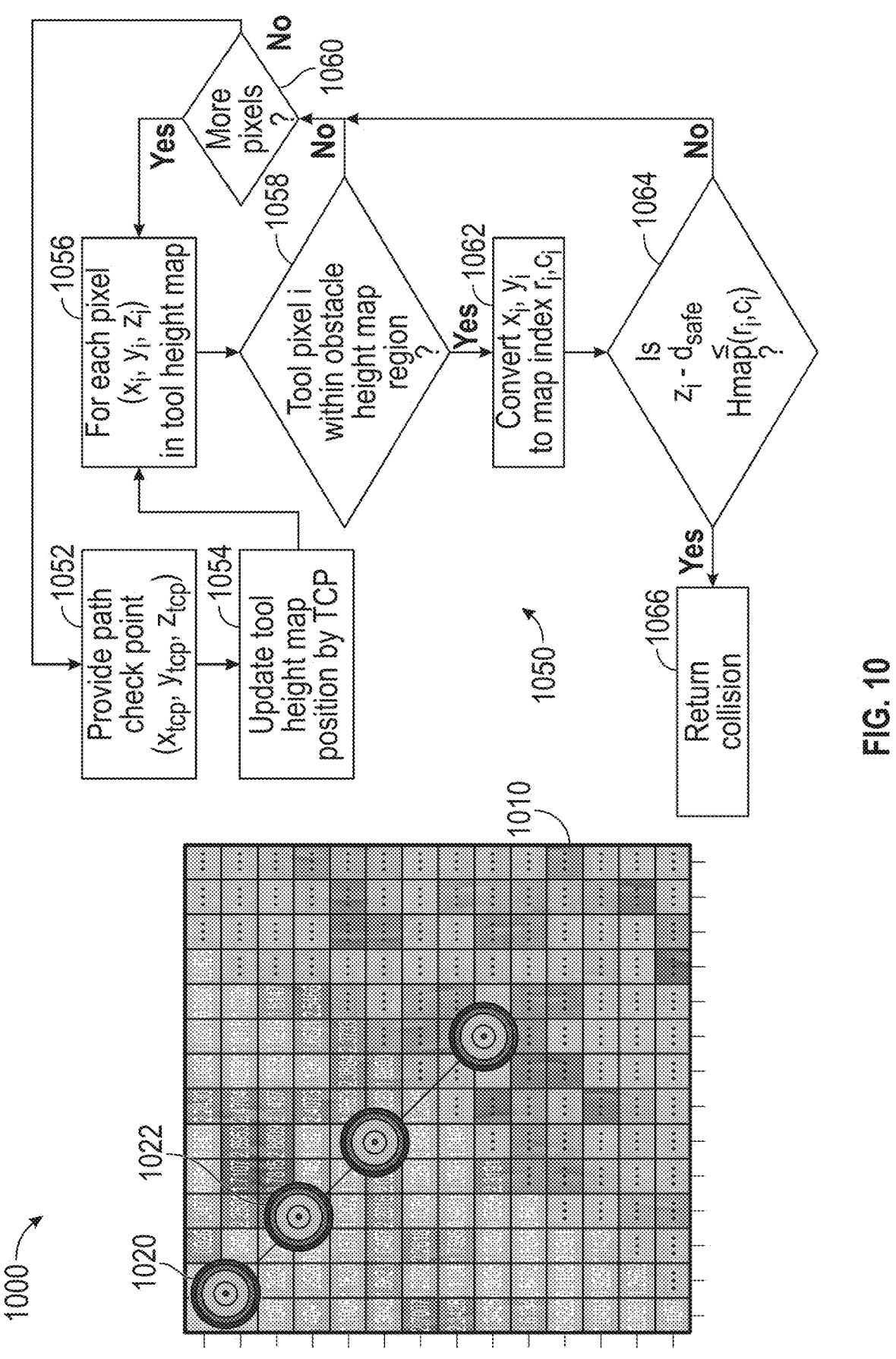
FIG. 10 is an illustration of a technique for interference checking path points of a machine tool path using an obstacle height map and a tool height map, where each pixel in the tool height map is interference checked for each path point, and a flowchart diagram of corresponding method steps, according to an embodiment of the present disclosure.

FIG. 10 includes an illustration 1000 of a technique for interference checking path points of a machine tool path using an obstacle height map and a tool height map, where each pixel in the tool height map is interference checked for each path point, and a flowchart diagram 1050 of corresponding method steps, according to an embodiment of the present disclosure. An obstacle height map 1010 includes height values for a 2D matrix of cells in an X-Y grid, as discussed above. The height map 1010 corresponds with the height map 940 depicted graphically in FIG. 9. The height map 1010 represents any obstacle environment which may exist in a workcell—such as a workpiece, a workpiece plus a fixture, etc. The height map 1010 is again shown somewhat conceptually in FIG. 10—with most of the height value numbers replaced by ellipses for simplicity. The grid cells of the height map 1010 are shaded to represent various ranges of the height value, as also discussed earlier.

A tool height map is shown superimposed on the height map 1010 at a plurality of interference check points (1020, 1022, and others unnumbered). The tool height map shown in the illustration 1000 corresponds with the tool height map 950 of FIG. 9. The interference check points 1020/1022/etc. are the discretized representation of a tool center point path, as discussed above. The flowchart diagram 1050 defines the steps performed for collision checking a tool height map against an obstacle (e.g., workpiece) height map.

At box 1052, an interference check point for the tool path is provided. The check point has a location $(x_{tcp}, y_{tcp}, z_{tcp})$ in the coordinates of the obstacle height map reference coordinate frame. At box 1054, the tool height map is positioned so that the location of the tool center point in the tool height map is at the current check point of the tool path. For example, in the illustration 1000, the tool height map is first moved to the check point 1020. At box 1056, an individual pixel i is selected in the tool height map. The pixel i has coordinates $(x_i, y_i, z_i)$ in the tool height map. Collision checking for the pixel i is then performed in the following steps.

At decision diamond 1058, it is determined whether the X-Y coordinates of the pixel i for the current check point lie within the region of the obstacle height map 1010. The pixel i has X and Y coordinates (in the obstacle height map reference frame) which are found by taking the X and Y coordinates of the current tool path check point and adding the X and Y coordinates of the pixel i relative to the tool center point in the tool height map. If, at the decision diamond 1058, the check point i has X and Y coordinates which are outside the obstacle height map region, then the process returns to decision diamond 1060.

If the coordinates of the pixel i for the current check point are within the obstacle height map region, then at box 1062, the X-Y coordinates of pixel i for the current check point are converted to obstacle height map row-column indices. In a similar manner to that discussed earlier with respect to FIG. 6, the calculation at the box 1062 identifies the grid cell row and column $(r_i, c_i)$ of the obstacle height map 1010 which is occupied by the pixel i for the current check point having coordinates of $(x_i, y_i)$.

At decision diamond 1064, the collision check calculation is performed by determining whether the Z coordinate of the pixel i for the current check point $(z_i)$ minus a safety margin $(d_{safe})$ is less than or equal to the value of the obstacle height map 1010 for the corresponding grid cell $(Hmap(r_i, c_i))$. The Z coordinate of the pixel i is determined by taking the Z coordinate of the current tool path check point and adding the Z coordinate of the pixel i relative to the tool center point in the tool height map.

If the answer is yes at the decision diamond 1064, then the process returns a collision condition at box 1066. If the answer is no at the decision diamond 1064, this means that pixel i of the tool height map for the check point being evaluated is safely above the obstacle height map 1010, and the process returns to the decision diamond 1060. At the decision diamond 1060, if more pixels of the tool height map remain to be evaluated for the current tool path check point, then the process returns to the box 1056 where the value of i is incremented by one (i=i+1) and the new pixel i is evaluated using the steps below the box 1056 as discussed above. This process continues until all of the pixels of the tool height map (e.g., a few hundred) have been evaluated for the current tool path check point. The spatial resolution and the resulting number of pixels in the tool height map may be chosen as suitable to provide a desired degree of accuracy for a particular application.

At the decision diamond 1060, if no more pixels of the tool height map remain to be evaluated for the current tool path check point, then the process returns to the box 1052 to evaluate the next check point in the tool path. This process continues until no check points remain in the tool path.

Collisions noted at the box 1066 may be handled by immediately computing a new collision avoidance waypoint with a greater height then the current check point, as discussed previously. Alternately, all of the collisions noted at the box 1066 may be stored until all pixels of the tool height map have been collision checked for all of the tool path check points, then each check point which has any tool height map pixel collisions may generate a new collision avoidance waypoint based on all of the tool height map pixel collision data for that check point.

To summarize the preceding discussion—the present disclosure, which is particularly applicable to machine tooling applications, uses height maps to enable rapid collision avoidance calculations in motion planning. A height map of the workpiece and/or any other obstacle in a workcell is created, and a representation of the machine tool is interference checked against the obstacle height map at points along a tool path. The representation of the machine tool may be simply the tool center point (i.e., the tip of the cutting tool), or the representation may be a height map of the tool in the form of a pixel map of heights.

The techniques described above enable extremely fast interference checking calculations to be performed in real time during motion planning, particularly when the machine tool is represented as only the tool center point. However, when a height map is used to represent the machine tool, the number of calculations required increases considerably, and computation speed suffers accordingly. The following discussion is directed to a technique for improving the speed of real-time interference checking calculations by pre-generating a workspace collision map and then performing a fast point-to-map collision check calculation during run-time motion planning.

Figure 11:
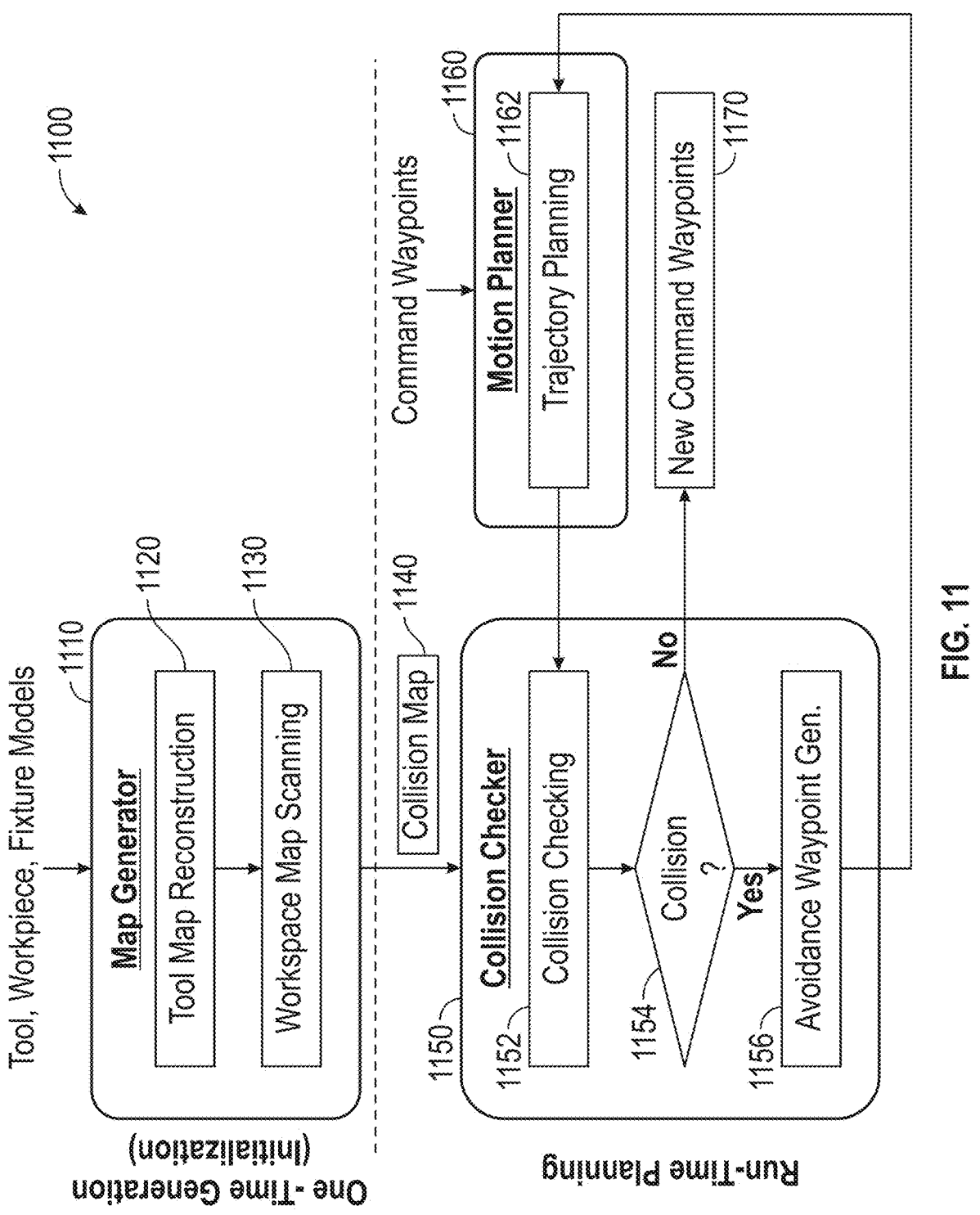
FIG. 11 is a flow chart diagram of a method for performing an interference check between a tool and a workspace obstacle, including pre-generation of a workspace collision map and rapid tool path interference checking using the collision map, according to an embodiment of the present disclosure.

FIG. 11 is a flow chart diagram 1100 of a method for performing an interference check between a tool and a workspace obstacle, including pre-generation of a workspace collision map and rapid tool path interference checking using the collision map, according to an embodiment of the present disclosure. The flowchart diagram of FIG. 11 is arranged with collision map pre-generation steps above a dashed line and run-time motion planning steps below the dashed line.

A map generator block 1110 includes a tool map reconstruction box 1120 and a workspace map scanning box 1130. The steps performed in the tool map reconstruction box 1120 are illustrated in FIG. 12, and the steps performed in the workspace map scanning box 1130 are illustrated in FIG. 13.

Figure 12:
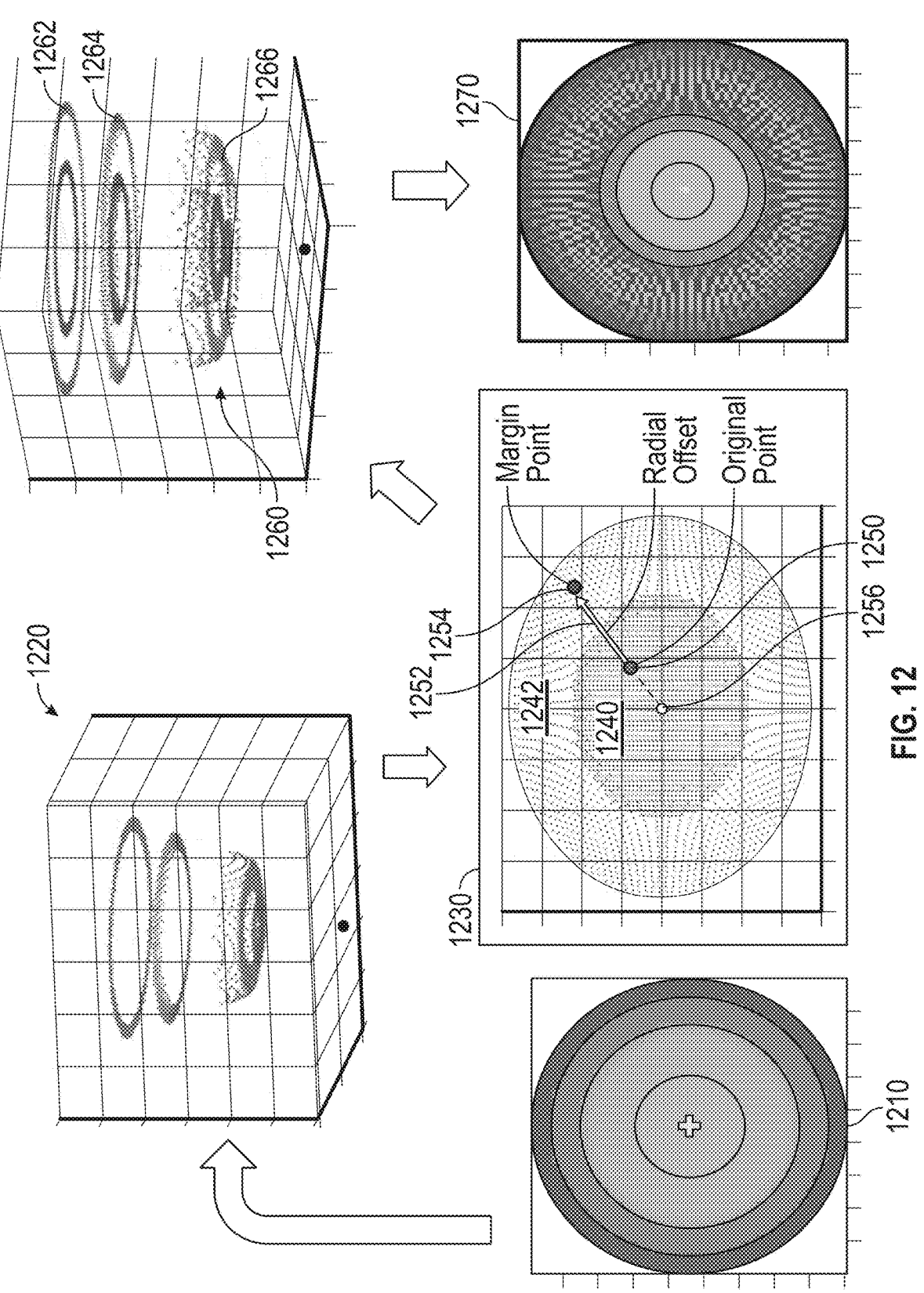
FIG. 12 is an illustration of a technique for reconstructing a tool height map with a radial margin, according to an embodiment of the present disclosure.
Figure 13:
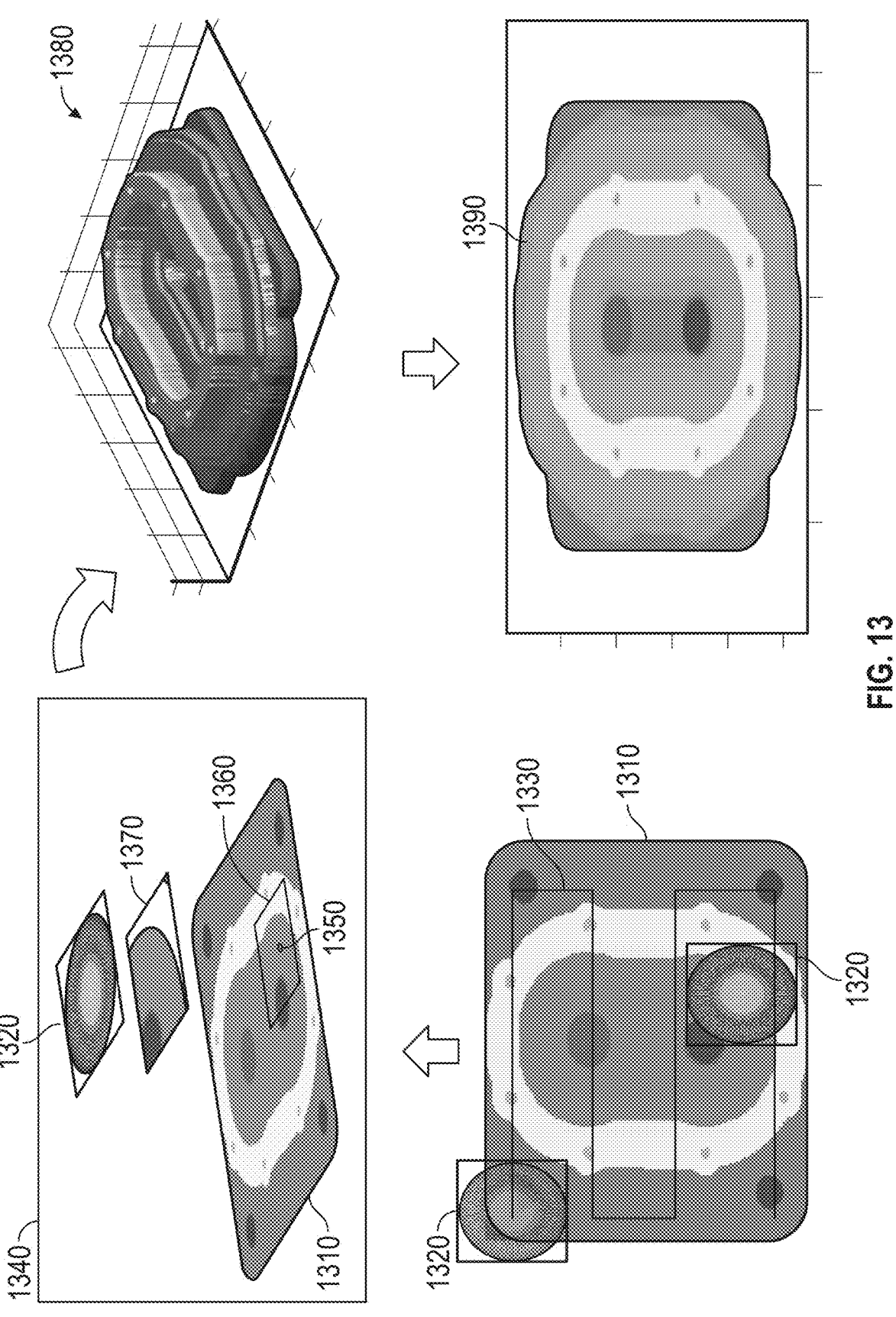
FIG. 13 is an illustration of a technique for creating a workspace collision map by scanning a tool height map over an obstacle height map, according to an embodiment of the present disclosure.

FIG. 12 is an illustration of a technique for reconstructing a tool height map with a radial margin, according to an embodiment of the present disclosure. An original tool height map 1210 and its corresponding original tool height map point set 1220 are shown at the top left. The original tool height map 1210 and the original tool height map point set 1220 are based on the actual shape of a tool body, as discussed earlier with respect to FIG. 8. Using the following steps, a new tool height map will be constructed which incorporates a radial clearance margin around the tool body.

A box 1230 includes a plan view of original points in an inner circle 1240 (these are from the original tool height map point set 1220) and margin points in an outer ring 1242. For each of the original points, a margin point is created which incorporates a radial clearance margin around the tool body. For example, for an original point 1250, a radial offset vector 1252 is applied, resulting in a margin point 1254. The radial offset vector 1252 is calculated as follows relative to a tool height map center point 1256 having coordinates (0,0,0).

Consider the original point 1250 having tool height map coordinates (x, y, z). The coordinates of the margin point 1254 are calculated using the following equations:

$$r = \sqrt{x^2 + y^2} \tag{1}$$

$$r' = r + marginR \tag{2}$$

$$x' = (r'/r) \cdot x \tag{3}$$

$$y' = (r'/r) \cdot y \tag{4}$$

where r is the original radius (the radial distance from the tool height map center point 1256 to the original point 1250), and r' is the radius to the margin point 1254 using a radial offset marginR. No vertical offset is provided to the points; therefore, the margin point 1254 has coordinates (x', y', z). The calculations described above are performed for each of the original points in the inner circle 1240, resulting in the set of margin points in the outer ring 1242. The value of the radial offset marginR may be chosen to suit a particular application (for example, 10 mm).

A combined point set 1260 is shown in isometric view at the top right of FIG. 12, where the points from the original tool height map point set 1220 are recognizable, and the margin points are clearly visible in outer bands 1262, 1264 and 1266. A new tool height map 1270 is shown in graphical form, including the data from the original tool height map 1210 and the data from the radial margin points discussed above. As discussed earlier with respect to other height maps, it is to be understood that a 2D numerical matrix or grid of pixels is created for the new tool height map 1270, containing data defining z(x, y). This grid of height data is what is used in the computations discussed below.

FIG. 13 is an illustration of a technique for creating a workspace collision map by scanning a tool height map over an obstacle height map, according to an embodiment of the present disclosure. An obstacle height map 1310 is provided as discussed several times previously. A tool height map 1320 is also provided. In FIG. 13, the tool height map 1320 is shown as being the new tool height map 1270 of FIG. 12, having a radial offset margin incorporated. However, the original tool height map 1210 (with no radial margin) may be used instead. Whether to include a radial margin around the tool height map, and if so how much, is a matter of preference for any given application.

The concept of the workspace collision map is embodied in the following steps;

Scan a tool height map over an obstacle height map to create a collision map grid, where each grid cell corresponds with a scan point.

Determine, for each scan point, what height the tool height map must have in order to avoid any collisions between any pixels of the tool height map and any cells of the obstacle height map.

Each grid cell of the collision map is then populated with the height value computed when the tool height map had the tool center point positioned in that grid cell of the collision map At the lower left of FIG. 13, a scan path 1330 is shown as having a back-and-forth shape. This is merely for illustration purposes. The actual scan pattern used, and the size of the collision map grid, is a matter of design preference. The collision map grid must have sufficient resolution so that the results are accurate when a tool center point is later collision checked against the collision map. For example the collision map may represent the workspace in a grid of 100×100 cells.

Box 1340 contains an illustration of the tool height map 1320 at one scan point over the obstacle height map 1310, and is used for discussion of the scan process and calculations. A scan point 1350 is one point along the scan path 1330. Around the scan point 1350, a patch 1360 is drawn on the obstacle height map 1310. The patch 1360 has a size which matches the size of a rectangle drawn around the tool height map 1320. A sub-height map 1370 is created by cropping the obstacle height map 1310 in the size of the patch 1360. The sub-height map 1370 and the tool height map 1320 each have the same size dimensions and the same pixel resolution in the X and Y directions (e.g., 100×100 pixels). Thus, there is a 1:1 correspondence between pixels in the sub-height map 1370 and pixels in the tool height map 1320.

For the scan point 1350, a collision map height value h is calculated using the sub-height map 1370 and the tool height map 1320 as follows. The collision map height value h is the height that the tool height map 1320 must be raised above the sub-height map 1370 in order to avoid any interference. A procedure is used where the value of h is set to zero, a calculation is performed, and then h is increased to a value which results in no interferences between the sub-height map 1370 and the tool height map 1320.

A temporary matrix tmp is defined which has dimensions equal to the number of pixels in the sub-height map 1370 and the tool height map 1320 (e.g., 100×100 pixels to use the same example as above). The values in the matrix tmp are calculated by adding h (initially zero) to the value of each pixel in the tool height map 1320 (toolHmap+h) and then subtracting the value of each pixel in the sub-height map 1370 plus a vertical clearance margin (subHmap+marginZ). Thus, the matrix tmp is computed as follows:

$$tmp = (toolHmap + h) - (subHmap + marginZ) \tag{5}$$

where toolHmap is the matrix of tool height map pixels and subHmap is the matrix of sub-height map pixels which has a 1:1 pixel correspondence.

After computing the matrix tmp for the current scan point and the current value of h, it is determined whether any values in the matrix tmp are less than zero. If so, this means that there is an interference between at least one of the pixels of the sub-height map 1370 and the corresponding pixel of the tool height map 1320. In this case, the value of h is increased by the amount of interference (to offset the most negative value in tmp), and the matrix tmp is recomputed for the same current scan point. The value of h which yields no negative values in the matrix tmp represents the tool center point height which is needed in order to avoid any interferences between the tool height map 1320 and the sub-height map 1370 at the current scan point.

The calculations described above result in a height value h for the scan point 1350; this value of h is used in the grid cell of the collision map which corresponds with the scan point 1350. This process is repeated for all of the scan points along the scan path 1330, resulting in a grid of height values covering the entire workspace.

A 3D model 1380 depicts the results of the collision map calculations described above. It can be seen that the 3D model 1380 looks generally similar to the 3D model of the workpiece which was shown earlier (in FIGS. 7 and 9). However, compared to the 3D model of the workpiece, the 3D model 1380 contains raised shoulders and platforms which are the result of lateral and diagonal interferences between the tool and the workpiece. These lateral and diagonal interferences are detected using the collision map construction process—scanning the tool height map over the obstacle height map—described above. A collision map 1390, shown in 2D graphical form, is the ultimate result of this process. As discussed earlier with respect to height maps, it is to be understood that a 2D numerical matrix or grid of pixels is created for the collision map 1390, containing data defining z(x, y). A tool center point path can be evaluated relative to this grid of height data to rapidly perform a trajectory interference check which incorporates the detection of lateral and diagonal interferences as discussed above.

Returning to FIG. 11, the collision map 1390 computed as shown in FIG. 13 is used as the collision map 1140. The collision map 1140 is provided as input to a collision checker block 1150, and command waypoints are provided as input to a motion planner block 1160. The process steps performed by the collision checker block 1150 and the motion planner block 1160 are essentially the same as the like elements of FIG. 5 discussed earlier-except in the case of FIG. 11 the tool center point path is checked against the collision map 1140 which has both obstacle height map and tool height map data built into it.

At box 1162, a trajectory is planned based on the command waypoints provided as input. This includes both generating a tool path and discretizing the tool path into a set of interference check points. The interference check points are the individual points along the continuous tool path which will be compared to the collision map. These steps were discussed earlier with respect to FIG. 5.

At box 1152, each of the interference check points from the box 1162 is collision checked against the collision map 1140. This calculation was discussed earlier with respect to FIG. 6, where each path check point is mapped to a grid cell of the collision map 1140 and the height (Z coordinate) of the path check point compared to the height value of the grid cell. At decision diamond 1154, it is determined whether any collisions have been detected at the box 1152. If any collisions are detected, then at box 1156, collision avoidance waypoints are generated for any interference check points which interfered with the collision map 1140. After new collision avoidance waypoints are generated at the box 1156, the process returns to the box 1162 to generate a new tool path using the collision avoidance waypoints. The new tool path trajectory is then discretized and the collision map interference checking process is repeated.

When the collision checking process results in no collisions, the process moves from the decision diamond 1154 to a block 1170 where the new command waypoints are output and used for machine tool motion control. The new command waypoints include a combination of the original command waypoints (typically at least the start and end points) and any collision avoidance waypoints which were generated at the box 1156 of a previous pass through the collision map checking process.

Recall that, in FIG. 11, the collision map generation calculations (above the dashed line) are performed in a one-time initial step for a given machining workspace (combination of tool, workpiece and other obstacles). This collision map generation is a fairly lengthy calculation process; in an experimental implementation of the disclosed technique, the collision map generation took over 1.5 seconds to complete on a given computing device. However, once the collision map has been generated, the collision checking calculations for a tool path trajectory are very fast, on the order of a few milliseconds for the same computing device. This is because the trajectory collision checking only involves a point-to-map calculation for the tool center point check points; the tool height map data is already built into the collision map. These interference checking calculations are fast enough to be performed in real time during motion planning, using the machine controller as the computing device.

As explained earlier, the interference checking using the collision map technique of FIGS. 11-13 is performed before a machine tool is physically moved along a trajectory. When an interference is detected in an upcoming motion step using the collision map interference checking method, the machine controller computes the collision avoidance waypoints and calculates a new collision-free trajectory before moving the tool.

Again, all of the steps of the method shown in FIGS. 11-13 are programmed in an algorithm which runs on a computing device having a processor and memory. The machine controller preferably performs the motion planning and collision checking steps of FIG. 11, while the collision map generation may be performed on the machine controller or another computing device.

As outlined above, the disclosed techniques for machine tool collision avoidance using height maps and collision maps improve the speed and accuracy of interference checking compared to prior art methods. Evaluations of the disclosed height map and collision map interference checking methods show that the techniques are accurate, can accommodate lateral and diagonal interferences between a tool and a workpiece when required, and are much more computationally efficient than existing techniques such as the axis-aligned bounding box tree method.

While a number of exemplary aspects and embodiments of the object interference checking technique using height maps and collision maps have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for interference checking a path of an object which moves in a workspace, said method performed on a computing device having a processor and memory and comprising:

creating a first height map having an array of pixels each defining a height of workspace obstacles above a reference plane;

creating a second height map having an array of pixels each defining a height of downward-facing surfaces of the object above a reference point on the object;

generating a collision map, including defining a grid of cells in the reference plane and, for each grid cell, determining a height of the reference point of the object required to avoid an interference between the second height map and the first height map, and storing the height as a grid cell value;

defining a plurality of check points of the object along the path, where for each of the check points, a corresponding grid cell in the collision map is identified by normal projection of the check point onto the reference plane, and a check point height is identified as the normal distance from the check point to the reference plane; and performing an interference check, for each of the check points, by comparing the check point height to the grid cell value for the corresponding grid cell.

2. The method according to claim 1 wherein the workspace obstacles include one or more of a workpiece upon which the tool performs an operation, fixtures, tables or other objects.

3. The method according to claim 1 wherein the reference plane is a principal plane of a reference coordinate frame having a defined position and orientation relative to a workspace world coordinate frame, including any combination of relative positions and orientations.

4. The method according to claim 1 wherein the collision map is generated once, and the interference check is performed for a plurality of paths.

5. The method according to claim 1 wherein the object is a tool, the path is a tool path, the first height map is a workspace height map, the second height map is a tool height map, and the reference point is a tool center point.

6. The method according to claim 5 wherein creating the tool height map includes adding a radial offset margin to each point on the downward-facing surfaces of the tool which is used to create the tool height map.

7. The method according to claim 5 wherein the heights in the workspace height map, the heights in the tool height map and the heights in the collision map are all measured in a vector direction perpendicular to the reference plane.

8. The method according to claim 5 wherein generating a collision map includes, for each grid cell of the collision map, positioning the tool height map with the tool center point at a location over the grid cell, defining a workspace height sub-map from a projection of the tool height map onto the workspace height map, and for each pixel of the tool height map, determining a height required in order to avoid collision with a corresponding pixel of the workspace height sub-map.

9. The method according to claim 8 wherein positioning the tool height map with the tool center point at a location over the grid cell, defining a workspace height sub-map from a projection of the tool height map onto the workspace height map, and identifying a corresponding pixel of the workspace height sub-map are all performed using a vector direction perpendicular to the reference plane.

10. The method according to claim 8 wherein, for each grid cell of the collision map, the grid cell value is stored which is equal to a largest of the determined heights for all of the pixels of the tool height map.

11. The method according to claim 8 wherein determining a height required in order to avoid collision with a corresponding pixel of the workspace height sub-map includes incorporating a vertical clearance margin.

12. The method according to claim 5 further comprising calculating a collision avoidance waypoint for any of the check points which yield an interference in the interference check, and computing a new tool path using the collision avoidance waypoints.

13. The method according to claim 12 further comprising sending motion commands to a machine tool, by the computing device, causing the machine tool to move the tool according to the new tool path.

14. A method for interference checking a path of a tool which moves in a workspace, said method performed on a computing device having a processor and memory and comprising:

creating a workspace height map having an array of pixels each defining a height of workspace obstacles above a reference plane;

creating a tool height map having an array of pixels each defining a height of downward-facing surfaces of the tool above a tool center point;

generating a collision map, including defining a grid of cells in the reference plane and, for each grid cell, determining a height of the tool center point required to avoid a collision between the tool height map and the workspace height map and storing the height as a grid cell value, including positioning the tool height map with the tool center point at a location over the grid cell, defining a workspace height sub-map from a projection of the tool height map onto the workspace height map, and for each pixel of the tool height map, determining a height required in order to avoid collision with a corresponding pixel of the workspace height sub-map;

defining a plurality of check points of the tool center point along the tool path, where for each of the check points, a corresponding grid cell in the collision map is identified by normal projection of the check point onto the reference plane, and a check point height is identified as the normal distance from the check point to the reference plane;

performing an interference check, for each of the check points, by comparing the check point height to the grid cell value for the corresponding grid cell;

calculating a collision avoidance waypoint for any of the check points which yield an interference in the interference check, and computing a new tool path using the collision avoidance waypoints; and sending motion commands to a machine tool, by the computing device, causing the machine tool to move the tool according to the new tool path.

15. A machine tool interference checking system comprising:

a machine moving a tool in a workspace; and a computing device having a processor and memory, said computing device being in communication with the machine and configured to perform steps including;

creating a workspace height map having an array of pixels each defining a height of workspace obstacles above a reference plane;

creating a tool height map having an array of pixels each defining a height of downward-facing surfaces of the tool above a tool center point;

generating a collision map, including defining a grid of cells in the reference plane and, for each grid cell, determining a height of the tool center point required to avoid an interference between the tool height map and the workspace height map, and storing the height as a grid cell value;

defining a plurality of check points of the tool along a tool path, where for each of the check points, a corresponding grid cell in the collision map is identified by normal projection of the check point onto the reference plane, and a check point height is identified as the normal distance from the check point to the reference plane; and performing an interference check, for each of the check points, by comparing the check point height to the grid cell value for the corresponding grid cell.

16. The system according to claim 15 wherein the workspace obstacles include one or more of a workpiece upon which the tool performs an operation, fixtures, tables or other objects.

17. The system according to claim 15 wherein the reference plane is a principal plane of a reference coordinate frame having a defined position and orientation relative to a workspace world coordinate frame, including any combination of relative positions and orientations.

18. The system according to claim 15 wherein the collision map is generated once, and the interference check is performed for a plurality of paths.

19. The system according to claim 15 wherein creating the tool height map includes adding a radial offset margin to each point on the downward-facing surfaces of the tool which is used to create the tool height map.

20. The system according to claim 15 wherein the heights in the workspace height map, the heights in the tool height map and the heights in the collision map are all measured in a vector direction perpendicular to the reference plane.

21. The system according to claim 15 wherein generating a collision map includes, for each grid cell of the collision map, positioning the tool height map with the tool center point at a location over the grid cell, defining a workspace height sub-map from a projection of the tool height map onto the workspace height map, and for each pixel of the tool height map, determining a height required in order to avoid collision with a corresponding pixel of the workspace height sub-map.

22. The system according to claim 21 wherein positioning the tool height map with the tool center point at a location over the grid cell, defining a workspace height sub-map from a projection of the tool height map onto the workspace height map, and identifying a corresponding pixel of the workspace height sub-map are all performed using a vector direction perpendicular to the reference plane.

23. The system according to claim 21 wherein, for each grid cell of the collision map, a height grid cell value is entered stored which is equal to a largest of the determined heights for all of the pixels of the tool height map.

24. The system according to claim 21 wherein determining a height required in order to avoid collision with a corresponding pixel of the workspace height sub-map includes incorporating a vertical clearance margin.

25. The system according to claim 15 wherein the computing device is further configured to compute a collision avoidance waypoint for any of the check points which yield an interference in the interference check, and compute a new tool path using the collision avoidance waypoints.

26. The system according to claim 25 wherein the computing device is further configured to send motion commands to the machine, causing the machine to move the tool according to the new tool path.

* * * * *